Aug. 22, 1950 T. B. HALL 2,519,458
SHOCK ABSORBING LANDING DEVICE FOR PARATROOPERS
Filed Oct. 25, 1948 2 Sheets-Sheet 1
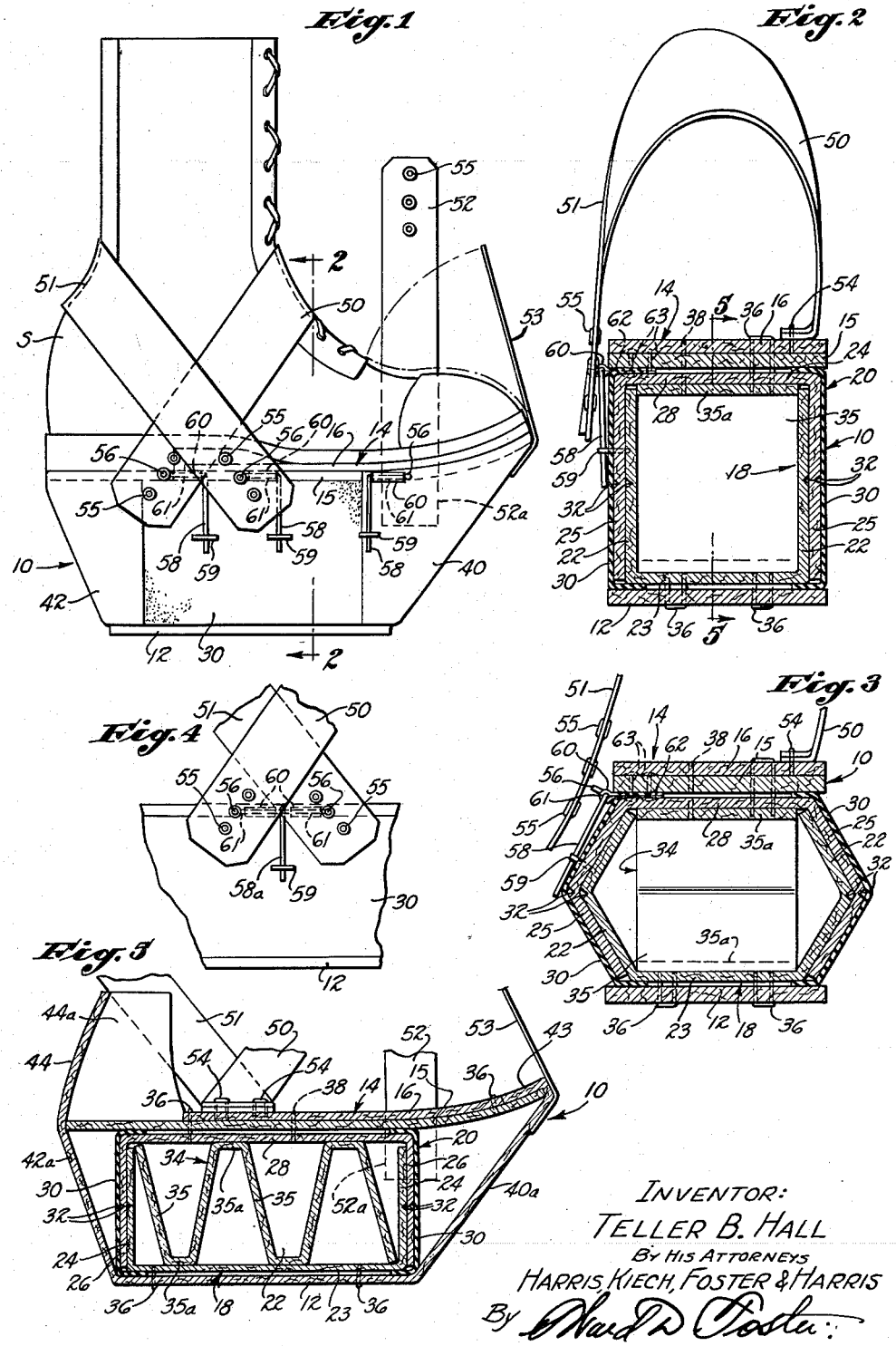
INVENTOR:
TELLER B. HALL
BY HIS ATTORNEYS
HARRIS, KIECH, FOSTER & HARRIS Aug. 22, 1950     T. B. HALL     2,519,458
SHOCK ABSORBING LANDING DEVICE FOR PARATROOPERS
Filed Oct. 25, 1948     2 Sheets-Sheet 2
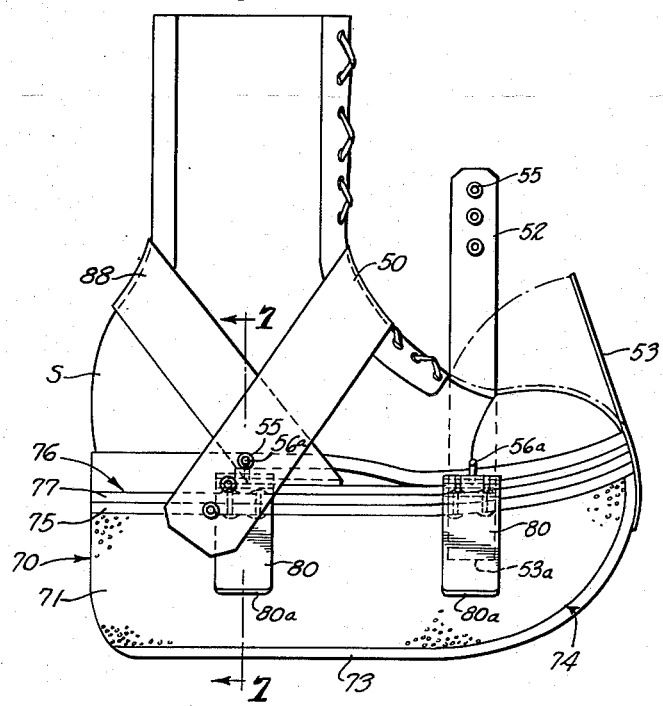
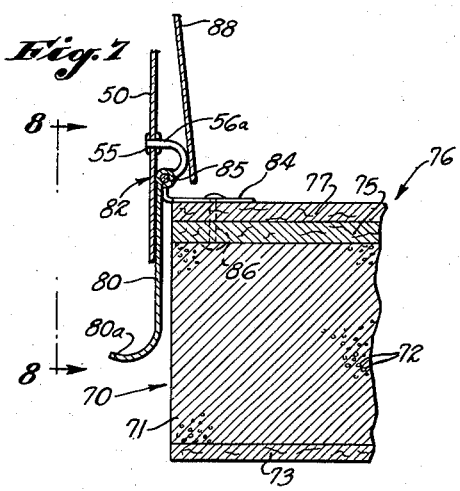
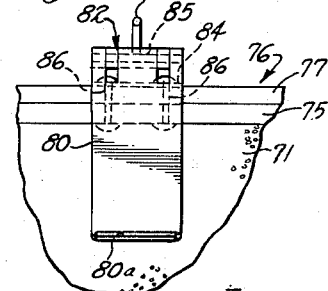
INVENTOR:
TELLER B. HALL
BY HIS ATTORNEYS
HARRIS, KIECH, FOSTER & HARRIS Patented Aug. 22, 1950

2,519,458

UNITED STATES PATENT OFFICE 2,519,458

SHOCK ABSORBING LANDING DEVICE FOR PARATROOPERS

Teller B. Hall, Los Angeles, Calif.

Application October 25, 1948, Serial No. 56,452

26 Claims. (Cl. 36—7.5)

This invention relates to shock-absorbing devices to be worn by parachutists, and more particularly to non-rebounding, collapsible, landing devices to be worn on the shoes of troops jumping en masse from aircraft.

The general object of this invention is to provide landing devices for paratroopers which are free from springs or other resilient elements which would cause rebound, and which are automatically detached from their shoes.

The few attempts that have been made to provide landing devices for parachutists have, for the most part, incorporated springs or other resilient structures that have been ineffective because the rebound imparted by such resilient elements has created upsetting effects and resulted in injuries to the user. Moreover, in employing safe landing devices for paratroopers, it is necessary that the troops walk on their landing devices to the escape hatch of the respective aircraft so that they may jump in rapid sequence in order to land in as consolidated a group as possible. Where springs are employed, walking is awkward and in addition the presence of springs or other resilient devices promotes the turning of ankles both as the troops walk along the floor of the aircraft and as they land upon the ground. As a consequence, structures of this type tend to increase injuries rather than to decrease them.

Therefore, it is an important object of my invention to eliminate all springs and similar resilient structures from landing devices for parachutists. A further object is to provide shock-absorbing devices for attachment to the feet on which paratroopers may run along the aircraft floor as they bail out, the devices under these conditions supporting the weight of the paratroopers and their equipment.

It is another object of this invention to provide shock absorbers of the indicated type which will be automatically detached from the feet upon striking the ground, so that the wearer is ready instantly to go into action.

It is a still further object to provide shock-absorbing landing devices of the mentioned type which constitute, in effect, miniature landing fields for the feet and which will crush without substantial rebound while landing and will at the same time offer sufficient resistance to cushion the landing shocks properly. It is also an object to provide such devices which will at the same time shape themselves to small rocks and the like present upon the surface of the ground where the landing takes place, and will in addition span gopher holes and other small depressions whereby to eliminate most tendencies to turn or sprain ankles or otherwise injure the parachutists when landing.

An additional object is to provide a construction for parachutists which will be so inexpensive to manufacture that it can be economically discarded after a single use, and, according to this invention, the devices are so permanently deformed as they collapse upon landing that they are in effect rendered unsuitable for further jumping. An incidental object is to produce such an inexpensive device whose construction may be so streamlined that it will fit the parachutists' shoes sufficiently closely that the shroud cords and similar portions of the parachute being used will not become fouled in the landing devices or between such landing devices and the shoes.

Another important object of this invention is to construct a crushable, permanently deformable landing device so that when it strikes the ground under the weight of the parachutist and his equipment, it will collapse in such a manner as not to throw the wearer's foot seriously out of its normal relation to the respective leg and ankle, the bottom of the structure assuming the general contour of the ground, and the sides of the device crushing correspondingly so as to maintain substantially the initial relationship of the shoe and the top of the structure, whereby to avoid ankle sprains and incidental injuries.

More specifically, it is an object of the invention to produce a crushable and permanently deformable, stiff box-like unit, preferably formed from paper products, which will support a weight in the order of 400 pounds to 600 pounds or more, so that a paratrooper with his equipment may run along the floor of an aircraft without collapsing the structure, the device, however, being susceptible to being crushed as the paratrooper strikes the ground by reason of the impact which always is in excess of about 600 pounds for each foot.

Another object of importance is to construct a box-like unit of the indicated nature which confines air, the structure providing for retarded release of the air so that the air is temporarily trapped under pressure to provide a cushioning effect supplementing the cushioning effect of the mechanical parts of the device and thereby further retarding the falling speed and taking up the incident shock as the wearer strikes the ground, and whereby any dangerous rebound is avoided.

Other objects, and the various structural features of the invention, will become apparent to those skilled in the art upon reference to the following specification and the accompanying drawings wherein certain embodiments of the invention are illustrated.

In the drawings:

Fig. 1 is principally a side elevation of one form in which my invention has been embodied.

Fig. 2 is a cross section taken on the section line 2—2 of Fig. 1;

Fig. 3 is a cross section similar to that of Fig. 2 but indicating collapsing of the parts and automatic release of means employed for attaching the device to a shoe;

Fig. 4 is an elevational detail indicating a modified form of means for automatically releasing the shoe-attaching means;

Fig. 5 is a longitudinal section taken approximately from the section line 5—5 of Fig. 2 to indicate appropriate internal construction, this figure also indicating a modification in the form of bracing means at the heel of the device which serve also as ankle protection;

Fig. 6 is a side elevational view corresponding with that of Fig. 1 and illustrating a modification;

Fig. 7 is a fragmentary cross-sectional detail taken on the section line 7—7 of Fig. 6;

Fig. 8 is a fragmentary side elevation indicated by the line 8—8 of Fig. 7 and further showing the construction of the automatic releasing means of this form; and Fig. 9 is a perspective view of the latch member of Figs. 1 to 3.

Each of the forms of the drawings illustrate a construction having proper crushing resistance in accordance with this invention. In the forms of Figs. 1 to 3 and 5, a body member 10 is shown which comprises a bottom plate 12 and a top plate 14. The top plate 14 of both forms comprises a full-length cardboard lower member 15 and a superimposed partial length upper cardboard member 16 which receives the sole of a shoe S, the heel thereof resting upon the rear portion of the member 15 approximately as indicated in Fig. 1. The bottom plate 12 may be of a similar cardboard material of appropriate strength, as hereinafter more fully disclosed. Between the bottom plate 12 and the top plate 14 there are disposed two cardboard, box-like weight supporting members 18 and 20, the lower box-like member 18 having its open side directed upwardly and telescoped within the upper box-like member 20. The lower inner box-like member 18 comprises side walls 22, a bottom wall 23, and end walls 24. The upper, outer box-like member 20 comprises side walls 25, end walls 26 and a top wall 28. The corners at the joints between the various walls of the box-like member 18 and the box-like member 20 may be formed in any conventional or preferred manner employed in making cardboard boxes. For the purpose of properly sealing the edges of the box structure formed by the telescoping members 18 and 20, a sheet 30 of relatively thin rubber is run around the sides and ends of the assembled unit and has its upper and lower edges cemented to adjacent portions of the bottom wall 23 of the box-like member 18 and the top wall 28 of the box-like member 20. This sheet thereby seals the joint at the lower edges of the side and end walls 25 and 26 adjacent the edges of the bottom wall 23 of the member 18. At the same time this sheet also seals the vertical edges of the member 20 where the side and end walls meet, and in addition seals any horizontal joints between these walls and the top wall 28. Obviously, such a sheet may be replaced by appropriate strips over some of the joints. In order that the side and end walls may assuredly bulge outward from the position of Fig. 2 to a position such as illustrated in Fig. 3, the outer surfaces of the various side and end walls 22, 24, 25 and 26 are kerfed as indicated at 32, or similarly tooled along their horizontal median lines. Since the rubber sheet 30 is intended also to offer some resistance to crushing, it is desired that the sheet 30 be not cemented to portions of the mentioned side and end walls immediately adjacent the vertical edges of the box structure so that the rubber sheet 30 may stretch without rupture.

In order to provide additional crushing resistance within the box assemblage provided by the two box-like members 18 and 20, additional cardboard elements are disposed in generally vertical positions within the device. In the form shown, these elements are produced from an elongated strip 34 of cardboard, this strip being folded in sort of a zig-zag fashion providing generally vertical resistance legs 35 connected by horizontally disposed knees 35a which may be cemented to the respective top and bottom walls 23 and 28. While it is preferred that the plate 12 and the plate members 15 and 16 and the side walls of the box-like members 18 and 20 be formed of a common laminated type of cardboard, the strip 34 may, if desired, be formed of any conventional corrugated cardboard structure, the corrugations extending vertically. This will depend largely upon the amount of crushing resistance required and the nature of the side and end walls 22, 24, 25 and 26. The bottom plate 12 and the members 15 and 16 of the top plate 14 may be either cemented to the top and bottom walls 23 and 28 of the box-like members 18 and 20, or may be stapled thereto as indicated at 36, or may be both cemented and stapled. Inasmuch as it is necessary to provide for escape of air as the structure collapses and inasmuch as it is desired also to retard such escape of air, a suitable port 38, which acts as a vent, is provided, this port, in the form shown, extending through the plate members 15 and 16 and the top wall 28 beneath the sole of the shoe S, and, if desired, under the instep portion thereof. Obviously, the port may be provided with a valve control if necessary or desirable. By employing such a venting means of proper capacity, objectional bursting of the structure with too sudden collapsing thereof is avoided.

As illustrated in Figs. 1 and 5, it is very desirable that the assembled box construction provided by the telescoped box-like members 18 and 20 have its base portion somewhat shorter than the shoe S, in order that the wearer may walk more or less readily while wearing the structure. However, such shortness would cause the heel portion of the shoe or the toe portion or both such portions to overhang the box-like assemblage and offer hazard from entanglement with the shroud cords of the parachute by which the wearer descends. To overcome this objection, and at the same time provide for walking convenience, the toe and heel portions of the top plate 14 are arranged to overhang the box-like structure as illustrated and the overlying regions are guarded by a foward housing 40 as seen in Fig. 1 and a rearward housing 42. These housings 40 and 42 may be formed from a very heavy paper cemented in place on the sides of the box-like member 20 and over the rubber sheet 30, the lower portions being brought into the shape indicated and the lower edges being secured, for example, between the bottom plate 12 and the adjacent portions of the assembled box structure, the upper edge portions being secured between the upper and lower members 15 and 16 of the top plate 14. The rearward housing 42 is similarly arranged and attached. While these housings 40 and 42 are illustrated as extending only a short distance beyond the ends of the assembled box structure, the heavy paper employed might be continued to completely enclose the sides thereof. Again, the housings 40 and 42 of Fig. 1 might be constructed of thin or corrugated cardboard which might constitute the bottom plate 12 and be provided with extensions 40a and 42a forming housing corresponding with housings 40 and 42. Here, the housing extension 40a may have its upper end 43 brought up over the edge portions of the lower member 15 to abut correspondingly retracted portions of the upper member 16. In addition, the upper portion of the rearward extension 42a is desirably carried upward above the rear portion of the top plate 14 to form an ankle brace 44 which rises to a suitable height for such a purpose and includes wings 44a which extend forward an appropriate distance as indicated.

In order for the structure of this invention to possess maximum usefulness, it is important that it be provided with means for attachment to the shoe S which will automatically disengage the shoe when the body member 10 is crushed as a consequence of landing upon the ground. This means of attachment comprises, in the forms shown, a forward elastic band 50 adapted to pass over the instep of the shoe, and a rearward elastic band 51 adapted to pass over the upper heel portion of the shoe. In addition, it may be desirable to employ a forward elastic band 52 passing over a toe portion of the shoe and, for some purposes, it might be further desirable to use a foremost strap 53 whose lower end is secured, as by cementing, to the foremost portion of the forward housing 40 or its counterpart extension 40a, the strap being adapted to fold over the toe extremity of the shoe and be brought down into the dotted-line portion indicated in Fig. 1 where it is retained by the transversely arranged band 52 when placed in operative position.

Each of the elastic band 50 and 51 is bound at one end to the body member 10 as by means of a staple 54 (Fig. 2) which retains both bands. The band 52 may have one end similarly attached or, as indicated at 52a (Fig. 1), such end may be cemented to the body member 10. Each of the bands 50, 51 and 52 is provided with apertures at its free end, these apertures being lined with eyelets 55 which are adapted to receive selectively trigger fingers 56 respectively carried by a plurality of latch arms 58 secured to one side of the body member 10. In the form shown, each latch arm 58 has its lower end attached to the side of the body member 10 as by a staple 59 so that the arm 58 travels with the upper portion of the respective side walls and moves its trigger fingers 56 into engaging position, as shown in Fig. 3, when the body member 10 collapses. Thus, upon crushing of the body member 10, the respective trigger fingers 56 are automatically moved to positions to release the respective eyelets 55 of the bands 50, 51 and 52. The upper end of each latch arm 58 is positioned by a hinge 60 which pivotally receives a transverse pintle 61 integrally connecting each trigger finger 56 with its latch arm 58. Each hinge 60 includes a hinge leaf 62 which is bound into position as by rivets 63 between the top plate 14 and the top wall 28 of the box-like member 20. If desired, the two latch arms 58 shown in Fig. 1 may be replaced by a single latch arm 58a as shown in Fig. 4, both of the pintles 61 being secured to the upper end of the single latch arm 58a.

The most suitable material found so far for the side, top, end and bottom walls of the described box structure is solid paper board, often called "fiber board" to distinguish it from the common corrugated paper board. This paper board can be procured in different thicknesses and different strengths. I have found that paper board of one-eighth inch thickness with a bursting strength of 275 lbs. to 450 lbs. is quite suitable for the box assembly and the top plates 14, whereas corrugated paper board seems more suitable for the streamlining members 40, 42, 40a and 42a of the device and for the bottom plates 12. It is to be understood that appropriate changes of material of adequate strength and resistance can be made without affecting the scope of the invention.

In the form of the invention illustrated in Figs. 6, 7 and 8, another type of crushable body member is shown. Here, the body member, which is generally designated at 70, is in the form of a continuous block of crushable material 71. This material 71 may be any adequately porous or cellular friable material which will break down when the paratrooper strikes the ground. As indicated, such a material would have a multiplicity of pores or cells 72. In a preferred structure, the material 71 would be a cellular baked rubber body wherein each cell 72 is distinct and filled with any appropriate gas such as nitrogen or air, the term "air" being intended to include any gas. However, if the body of the material offers sufficient crushing resistance, the cells 72 may in general be joined and thereby provide a more or less porous body. The underside of the block of crushable material 71 preferably has secured thereto a bottom plate 73 corresponding generally with the bottom plate 12 of the other forms of the invention, and this bottom plate may be in the form of cardboard or the like as employed for such other forms. The block of crushable material 71 is preferably rounded off at the rear to a small degree, and especially is rounded off at the forward portion as indicated at 74 for the purpose of facilitating walking. The bottom plate 73 is correspondingly rounded and extends upward to the underside of the lower member 75 of a top plate 76 which includes an upper member 77, the members 75 and 77 corresponding in general with the members 15 and 16 of the other forms. The lower member 75 is attached to the upper face of the block of crushable material 71 by cementing, in the same way that the bottom plate 73 is attached, and the upper member 77 is similarly attached to the lower member 75. These members also may be formed of cardboard, but any other material suitable for the purpose may be used. In this form, an automatically releasable elastic band 50 over the instep is employed as in the other forms, one end of the band being secured to the body member 70 in any appropriate manner, and the other end of the band being provided with a plurality of holes with eyelets 55 for the purpose of receiving a trigger finger 56a corresponding generally with the trigger fingers 56. However, since the block of crushable material 71 of this form crushes without substantial lateral expansion, a latch arm 80 of different type is employed so that it may be swung upon striking the ground as the material 71 crushes. For this purpose the lower extremity of the latch arm 80 is curved at 80a in such a manner as to cause such lower end to swing outward upon striking the ground and swing the trigger finger 56a inward sufficiently to release the latter from its eyelet 55. Thus, upon release, the elasticity in the band 50 causes it to disengage the shoes. To provide for the swinging of the latch arm 80 and trigger finger 56a, a piano-type hinge 82 may be provided between the latch arm 80 and a hinge leaf 84, any appropriate pintle 85 being employed to connect the parts. The hinge leaf 84 may be secured to the top plate 76 of the crushable structure by rivets 86. Figures 6, 7 and 8 also illustrate the employment of a heel strap 88, both ends of which are permanently attached to top plate 76. Such an arrangement is very satisfactory for most uses and eliminates the necessity for providing a second latch arm 80 and trigger finger 56a. However, if desired, the single trigger finger 56a may receive adjacent ends of both the elastic band 50 and the heel strap 88. Also, as indicated, this form of the device may be provided with both the forward elastic band 52 and the foremost strap 53 illustrated in Figs. 1 and 5.

Operation

In using the landing devices of this invention, a paratrooper or other parachutist carries a pair of the structures to the aircraft with his pack. While en route to the location where he is to bail out, he attaches the devices to his shoes. This is done by the simple expedient of placing each foot on the respective structure in the position indicated in the drawings, and then passing the various bands 50, 51, 52 and 53 into their operative positions illustrated. Or, in the case of the construction of Fig. 6, the heel is first slipped into the heel strap 88, and the bands 50, 52 and 53 then operatively positioned.

When orders are given to leave the aircraft, the paratrooper runs rearward in much the same way that he would run if the landing devices were not attached. As a consequence he is not slowed down in leaving the ship, and as a further consequence all of the men who are bailing out at a given time get out relatively close to one another so that they may quickly assemble for the operation planned as soon as they land. When he reaches the ground, he lands in the usual way, but with much less shock and with much more safety than has been possible heretofore. These effects are the combined result of the gradual breaking down of the box structure as it crushes, the retarded venting of the air through the port 38, stretching of the rubber sheet at the corners to accommodate itself to the flexures at the various points, and a certain amount of unevenness of crushing which tends to maintain the relationship of the paratrooper's feet with respect to his legs and ankles even though the ground contour be substantially different from the normal position of the feet as the paratrooper lands. As a consequence of these conditions, there is much less tendency to turn the wearer's ankles as he lands, because his feet assume the contour of the ground somewhat gradually. Again, if one of the devices strikes a small rock, the bottom plate 12 (or 73) yields considerably to accommodate the rock. Also, the device will bridge smaller holes which might otherwise tend to twist the ankles. Cushioning of the descent by reason of these characteristics of the landing devices prevents development of a stinging or numbing feeling that commonly occurs in the feet and legs upon striking the ground. Thus, it becomes much easier for the paratrooper to go quickly into action after landing.

Since the structures of this invention will be built to withstand an effective weight of 500 to 600 pounds, it is apparent that the usual shock weight which is somewhere in the neighborhood of 1000 pounds will be very effectively cushioned by the slowing up of the collapsing or crushing action. This is true, not only where the box-like structure of Figs. 1 to 5 is employed, but also where the crushable block of Figs. 6 to 8 is employed.

When the parachutist strikes the ground and the box structure of the forms of Figs. 1 to 5 collapses sufficiently, the latch arms 58 swing to such an angle as to release the trigger fingers 56 from the eyelets 55 of the various elastic bands 50, 51 and 52, thereby automatically releasing the wearer's feet so that he may promptly move forward. Meanwhile, the contour of the forward and rearward housings 40 and 42 will have prevented fouling of the shroud cords of the parachute. In a similar manner, the elastic bands 50 and 52 of the form of Figs. 6, 7 and 8 will have been released as the thickness of the blocks of crushable material 71 becomes sufficiently reduced for the curved portions 80a of the lower ends of the latch arms 80 to strike the ground and swing the latch arms 80 so that they will effect release of the trigger fingers 56a. With this form, the crushing resistance of the material 71 itself has a retarding effect and the air cells 72 produce a cushioning effect similar to that accomplished by the outward bulging of the side walls of the forms of Figs. 1 to 5 and the retarded venting of the contained air through the port 38.

The presence of the kerfs 32 in the side walls of the two box-like members 18 and 20 insures the bulging outward and a rather uniform cushioning action. At the same time, the various rubber-covered joints, which automatically provide as many hinge structures, permit that portion of the landing device to yield most which first strikes the ground, the other portions then successively yielding so that the wearer's foot gradually assumes the ground contour without spraining or undue twisting of the ankles. If desired, the bottom of the box structure may be built so as to be more readily crushable than the top and thereby be capable of conforming more readily with small rocks and the like which may be struck upon landing.

Since the structures of this invention have their usefulness destroyed when the wearer lands upon the ground, and since his feet are automatically released upon landing, the devices are allowed to remain where discarded.

Since various modifications of the generic invention herein disclosed will become apparent to those skilled in this art, it is intended to protect all forms that fall within the scope of the patent claims.

I claim as my invention:

1. A landing device for aerial use, comprising in combination: a body member having upper and lower faces; ground-engaging means carried by said lower face; article-receiving means carried by said upper face; crushable side-forming means for maintaining said upper and lower faces in spaced relation and releasable article-engaging means carried by said device to engage such article and releasably retain the device upon such article.

2. A combination as in claim 1 including catch means carried by said body member for releasably engaging said article-engaging means, said catch means being actuable upon collapse of said body member to release said article-engaging means.

3. A combination as in claim 1 wherein said side-forming means is formed of materials normally offering resistance to weight resting thereon and collapsible under the shock of the weigh on landing.

4. A single-use landing device for parachutists comprising in combination: a deformable body member of substantial vertical thickness to offer substantial protective resistance to landing shock by collapse thereof and without substantial rebound; an under surface provided by said body member for engagement with the ground upon landing; an upper surface provided by said member for receiving the sole of a shoe worn by a parachutist; releasing means for releasably engaging said shoe to hold the latter upon said body member; and retaining means for releasably connecting said releasing means with said body member and actuable upon striking of the ground by said body member to release said releasable means from said shoe.

5. A combination as in claim 4 including means for overlying spaces between said body member and said shoe to exclude portions of a parachute and avoid entanglement therewith.

6. A combination as in claim 4 wherein said retaining means includes latch means hinged upon said body member and adapted for engagement with said releasing means, said retaining means being automatically swingable upon said striking of the ground to move said latch means from engagement with said releasing means.

7. A single-use landing device for a parachutist comprising in combination: a crushable air-containing body member of substantial vertical thickness to offer protective resistance to landing shock, said device having sufficient resistance to crushing to support the parachutist's weight normally but crushable upon landing, said device having top and bottom portions, the bottom portion being adapted to engage the ground upon landing, and the top portion being adapted to receive the sole of the parachutist's shoe; and releasable means adapted for engagement with said body member to engage over upper portions of said shoe and hold the device upon the shoe and including means for attachment to said body member.

8. A combination as in claim 7, including automatically actuable retainer means for connecting said releasable means to said body member and automatically operable upon striking the ground to release said releasable means.

9. A combination as in claim 7 wherein said crushable body member includes walls retaining air in compressible condition and means retarding release of said air under compression of said landing shock.

10. A combination as in claim 7 including vent means for said body member to retard escape of air from said body member and increase said protective resistance.

11. A combination as in claim 7 wherein said body member is provided with lateral wall members capable of normally supporting the parachutist's weight and collapsing under said landing shock.

12. A combination as in claim 7 wherein said body member is provided with lateral, collapsible wall members which are grooved on one side to control the direction of collapse of the respective walls.

13. A landing device for parachutists comprising in combination: a deformable, air-containing body member provided with lateral, collapsible wall members, said body member providing an upper wall to receive the heel and sole of a parachutist's shoe and a lower wall to strike the ground upon landing, said lateral walls being formed of crushable material, said lateral walls providing joints which yield during crushing, and means reinforcing said joints.

14. A landing device as in claim 13 wherein said crushable material forming said walls is laminated.

15. A landing device as in claim 13 wherein said reinforcing means include a layer of rubber-like material overlying said joints to be stretched upon bending and afford added resistance to deformation.

16. A landing device for parachutists comprising in combination: a crushable air-containing body member having collapsible lateral walls adapted to bulge under landing shock, said member also having a top wall adapted for reception of the sole of a parachutist's shoe and a bottom wall adapted to strike the ground; vent means for controlling the escape of air; and means for detachably connecting said body member to said shoe.

17. A combination as in claim 16 wherein said connecting means includes means for automatically releasing such connecting means from said shoe when the device strikes the ground in landing.

18. A combination as in claim 16 wherein said lateral walls are resistant to the weight of the parachutist for walking but yieldable upon landing impact of the parachutist.

19. A combination as in claim 16 wherein adjacent portions of said walls at joints and places of bulge are connected and sealed by thin rubber-like material capable of stretching during bulging and supplying added resistance to deformation of the device.

20. A combination as in claim 16 wherein said bottom wall is composed of material which will yield to acommodate stones and the like upon ground struck by the device.

21. A combination as in claim 13 including upstanding crushable wall means within said body member walls to supply added resistance to deformation on landing.

22. A combination as in claim 7 wherein said body member comprises a block of permanently crushable material having a multiplicity of air cells.

23. A shock absorbing landing device in the form of a box-like structure provided with means attachable to the shoes of a paratrooper, said structure being formed from stiff, yieldable material having the capacity of carrying the full weight of the paratrooper but weak enough to collapse under the weight of the paratrooper upon striking the ground following a jump from aircraft whereby to cushion said paratrooper's landing.

24. A device as in claim 23 wherein said structure includes wall means enclosing an air chamber, said structure having a restricted opening from said chamber to retard escape of air and further cushion the fall of the paratrooper.

25. A device as in claim 23 including means attached to said structure for automatically disengaging said means attachable to said shoes upon striking the ground.

26. A shock absorbing device made of crushable material having predetermined crushig resistance and forming walls enclosing an air chamber and having restricted vent means to control the escape of air whereby, when the device is weighted and drops from an appreciable height, the force of the fall causes said walls to crush gradually under the weight and compress the air in said chamber, whereby air escapes at a retarded rate through said vent means and absorbs the landing shock.

TELLER B. HALL.

No references cited.

Certificate of Correction

Patent No. 2,519,458 — August 22, 1950

TELLER B. HALL

It is hereby certified that error appears in the printed specification of the above numbered patent requiring correction as follows:

Column 5, line 68, for the word "engaging" read *disengaging*; column 9, line 15, before "weight" insert *a*; line 17, for "weigh" read *weight*; column 11, line 10, for "crushig" read *crushing*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*